US012751892B1

(12) United States Patent
Zhou

(10) Patent No.: US 12,751,892 B1
(45) Date of Patent: Oct. 6, 2026

(54) MASSAGER

(71) Applicant: SHENZHEN CHUANGTUO E-COMMERCE CO., LTD., Shenzhen (CN)

(72) Inventor: Yong Zhou, Shenzhen (CN)

(73) Assignee: SHENZHEN CHUANGTUO E-COMMERCE CO., LTD., Shenzhen (CN)

( * ) Notice: Subject to any disclaimer, the term of this patent is extended or adjusted under 35 U.S.C. 154(b) by 0 days.

(21) Appl. No.: 19/377,286

(22) Filed: Nov. 3, 2025

(30) Foreign Application Priority Data

Sep. 25, 2025 (CN) ......................... 202522076323.5

(51) Int. Cl.
*A61H 19/00* (2006.01)

(52) U.S. Cl.
CPC ............. *A61H 19/32* (2013.01); *A61H 19/44* (2013.01); *A61H 2201/165* (2013.01)

(58) Field of Classification Search
None
See application file for complete search history.

(56) References Cited

U.S. PATENT DOCUMENTS

2007/0142754 A1* 6/2007 Nan ........................ A61H 19/44
601/72
2013/0289346 A1* 10/2013 Standfest ............... A61H 19/00
600/38
2018/0311105 A1* 11/2018 Lonergan ................. A63H 3/04
2021/0077341 A1* 3/2021 Tang ....................... A61H 19/34
2023/0310262 A1* 10/2023 Crozier .................. A61H 19/50
600/38
2025/0221884 A1* 7/2025 Weekly .................. A61H 19/00

OTHER PUBLICATIONS

Sex machine attachments: What fits, fails, and what's worth it. Lovense. (Jul. 24, 2018). https://www.lovense.com/sex-blog/sex-toys/sex-machine-attachments (Year: 2018).*

* cited by examiner

*Primary Examiner* — Charles A Marmor, II
*Assistant Examiner* — Marc D. Honrath
(74) *Attorney, Agent, or Firm* — HOWARD M COHN and Associates, LLC

(57) ABSTRACT

A massager includes a master controller, at least one deformable body, and at least one vibrating assembly. The at least one vibrating assembly is disposed in and wrapped by the at least one deformable body. The at least one vibrating assembly is capable of vibrating. The at least one deformable body is in a column shape in an initial state. The at least one deformable body is connected to the master controller. The at least one deformable body is deformable to change a position of the at least one vibrating assembly relative to the master controller. The at least one deformable body is capable of maintaining a current deformed state after deformation.

15 Claims, 17 Drawing Sheets

MASSAGER

TECHNICAL FIELD

The present disclosure relates to a field of massage, and in particular to a massager.

BACKGROUND

Conventional massagers, such as vibrating cock sleeves, are designed as ring structures that are configured to be sleeved on the penis. The vibrating cock sleeves each has a built-in vibrating motor, and the built-in vibrating motor is configured to generate vibrations that directly act on the penis.

SUMMARY

The present disclosure provides a massager. The massager comprises a master controller, at least one deformable body, at least one vibrating assembly, and at least one wire.

The master controller comprises a housing and a power supply component. The power supply component is disposed in the housing. The at least one wire passes through the housing and is electrically connected to the power supply component. The at least one wire is electrically connected to the at least one vibrating assembly.

The at least one deformable body is physically connected to the housing. The at least one deformable body comprises an outer deformable component and an internal deformable component. The outer deformable component is made of a non-metal material. The at least one vibrating assembly is completely disposed in and wrapped by the outer deformable component. The internal deformable component is at least partially disposed in the outer deformable component. The outer deformable component at least partially wraps the internal deformable component. The at least one wire is partially disposed in and partially wrapped by the outer deformable component.

The at least one deformable body is deformable, and the internal deformable component maintains a current deformed state of the at least one deformable body after the at least one deformable body is deformed.

Compared to a vibrating cock ring in the prior art, the at least one deformable body of the massager in the disclosed embodiment initially assumes a long, cylindrical shape. The at least one deformable body is capable of deforming and maintaining the current deformed state, allowing the user to adjust a shape of the at least one deformable body as needed. For example, the user is able to wrap the at least one deformable body around the penis, and the user is also able to position the at least one vibrating assembly as desired, such as on the penis, anus, or vagina. Therefore, the massager is able to meet needs of the user in a variety of scenarios.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

For a complete understanding of the present disclosure and its characteristics, the following description will be made in conjunction with the accompanying drawings, where the same reference numbers in the following description indicate the same structures.

In the drawings.

Figure 1:
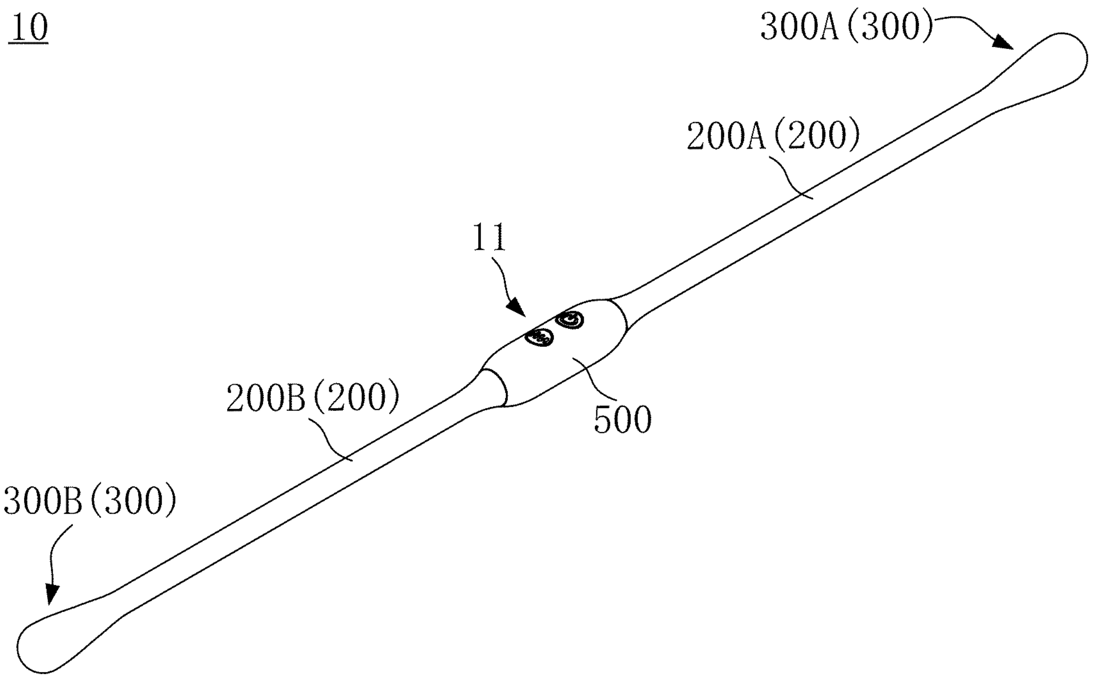
FIG. 1 is a schematic diagram of a massager according to a first embodiment of the present disclosure.

10—massager; 11—master controller; 12—connecting joint; 20—massager; 21—master controller; 22—deformable body; 23—vibrating assembly; 30—massager; 31—master controller; 32—deformable body; 33—vibrating assembly; 40—massager; 41—master controller; 42—deformable body; 43—vibration assembly; 100—housing 110; 100A—first shell; 100B—second shell; 110—main body portion; 120—transition portion; 121—limiting structure; 130—mounting portion; 140—fixing structure; 101—first mounting space; 102—second mounting space; 103—third mounting space; 105—mounting hole; 106—through hole; 200—deformable body; 200A—first deformable body; 200B—second deformable body;

210—outer deformable component; 211—first connecting portion; 212—second connecting portion; 213—deformable portion; 214—connecting portion; 216—fixing space; 220—internal deformable component; 2111—fixing groove 2121—first injection molding space; 2122—second injection molding space; 2123—third injection molding space; 2131—channel; 300—vibrating assembly; 310—vibrating component; 320—sleeve; 321—first sleeving portion; 322—second sleeving portion; 323—stopping structure; 324—first sleeving space; 325—second sleeving space; 326—through hole; 300A—first vibrating assembly; 300B—second vibrating assembly; 400—wire; 400A—first wire; 400B—second wire; 500—sealing sleeve; 510—first sealing portion; 511—accommodating space; 512—through hole; 520—second sealing portion; 521—first ring structure; 522—second ring structure; 523—first sealing space; 524—second sealing space; 525—step surface; 511—third sealing space; 600—power supply component; 700—control component; 710—control main board; 720—operating switch; 800—charging terminal.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. The following description of at least one exemplary embodiment is merely illustrative and is in no way intended as any limitation on the present disclosure, applications thereof, and use thereof. Based on the embodiments of the present disclosure, all other embodiments obtained by those of ordinary skill in the art without creative work shall fall within the protection scope of the present disclosure.

Reference herein to "embodiment" or "implement" means that a particular feature, structure, or characteristic described in connection with one embodiment or one implement may be comprised in at least one embodiment of the present disclosure. The appearances of the "embodiment" in various positions in the specification are not necessarily referring to the same embodiment, and are not independent or alternative embodiments mutually exclusive of other embodiments. Those skilled in the art explicitly and implicitly understand that the embodiments described herein may be combined with other embodiments.

As shown in FIGS. 1-17, one embodiment of the present disclosure provides a massager 10. The massager 10 comprises at least one deformable body 200 and at least one vibrating assembly 300. The at least one deformable body 200 is in a column shape in an initial state. The at least one deformable body 200 is deformable and is capable of maintaining a current deformed state after deformation. The at least one vibrating assembly 300 is disposed in and wrapped by the at least one deformable body 200, and the at least one vibrating assembly 300 is capable of vibrating. Compared to a vibrating cock ring in the prior art, the at least one deformable body 200 of the massager 10 in the disclosed embodiment initially assumes a long, cylindrical shape. The at least one deformable body 200 is capable of deforming and maintaining the current deformed state, allowing the user to adjust a shape of the at least one deformable body 200 as needed. For example, the user is able to wrap the at least one deformable body 200 around the penis, and the user is also able to position the at least one vibrating assembly 300 as desired, such as on the penis, anus, or vagina. Therefore, the massager 10 is able to meet needs of the user in a variety of scenarios.

Figure 2:
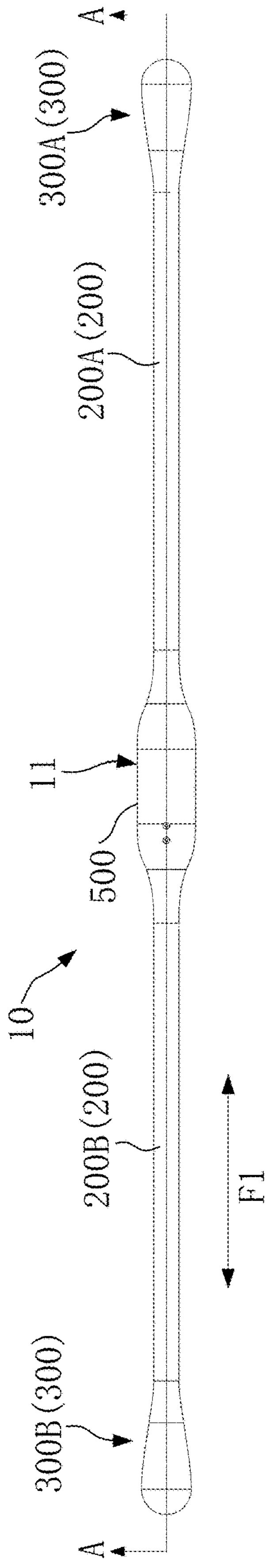
FIG. 2 is another schematic diagram of the massager according to the first embodiment of the present disclosure.
Figure 3:
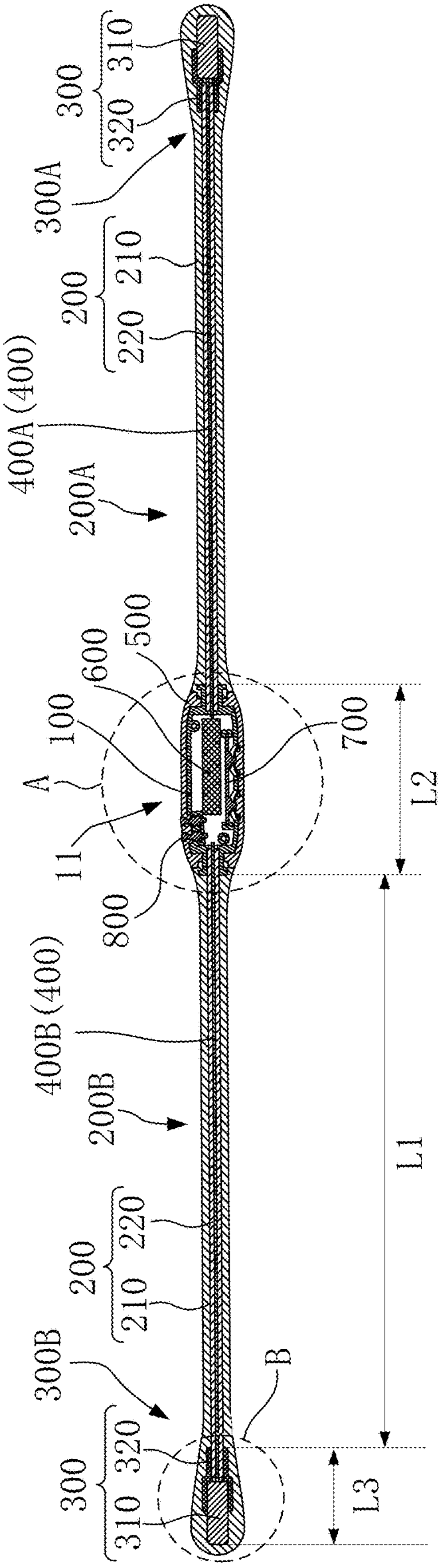
FIG. 3 is a cross-sectional schematic diagram of the massager taken along a line A-A shown in FIG. 2.
Figure 4:
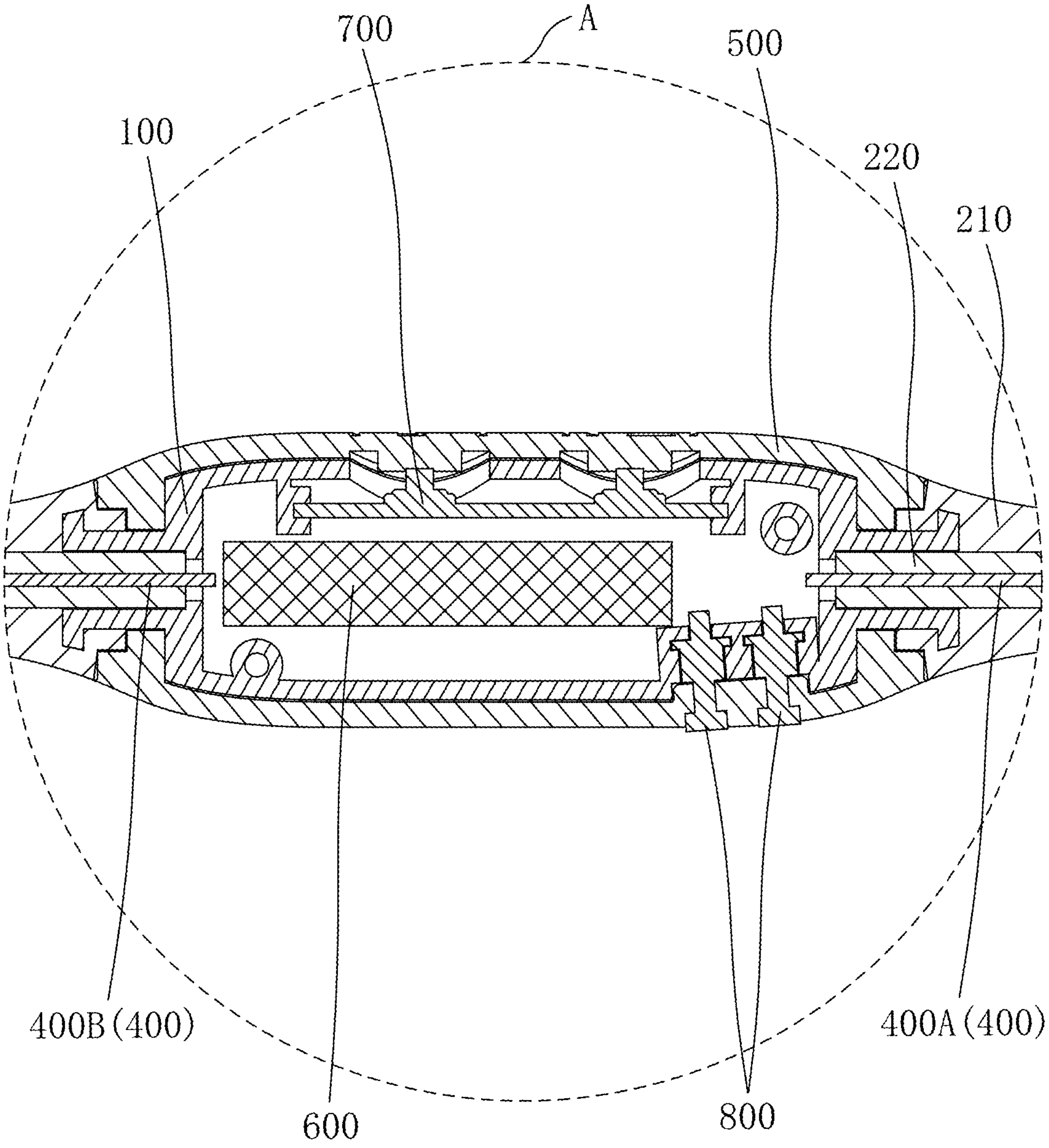
FIG. 4 is an enlarged schematic diagram of portion A shown in FIG. 3.
Figure 5:
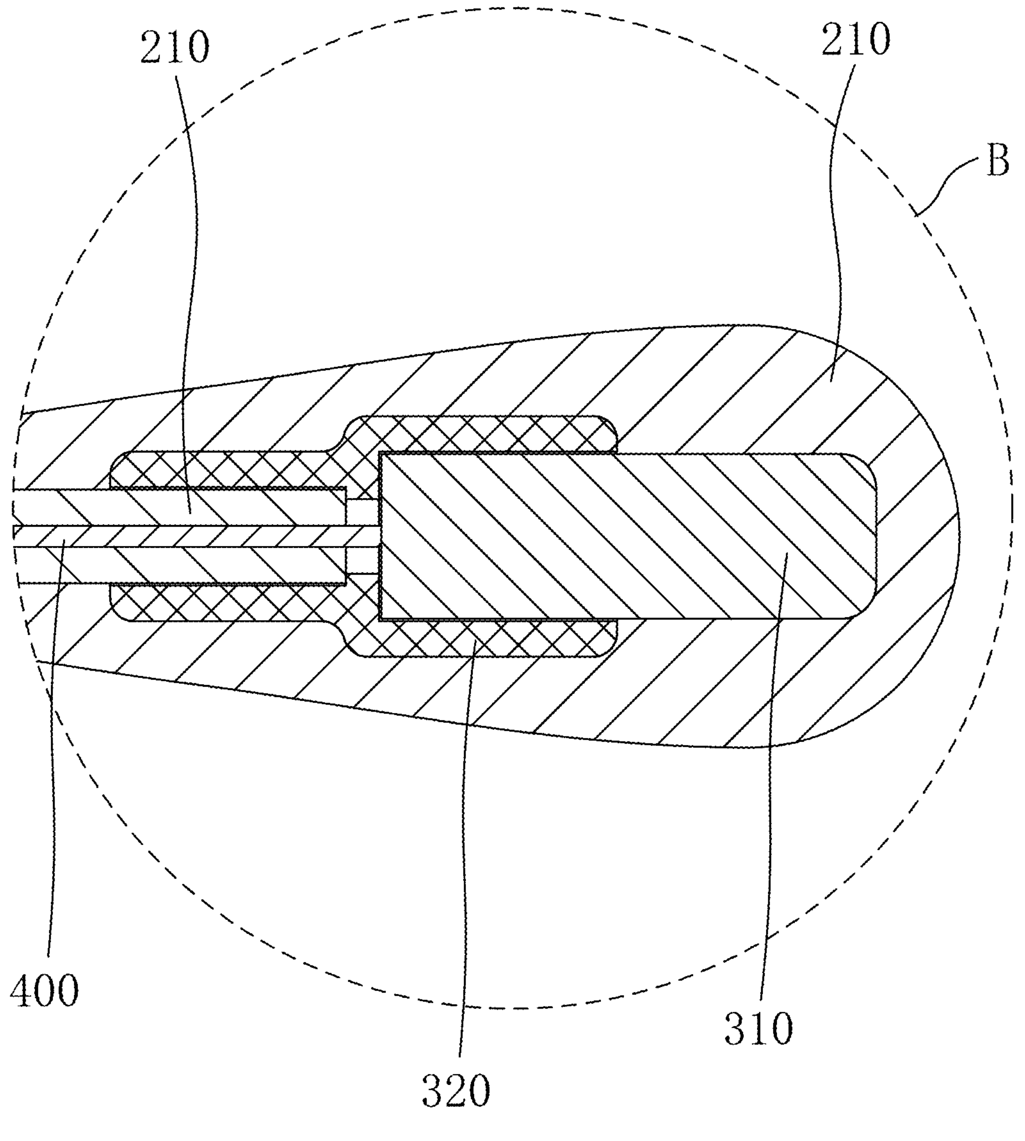
FIG. 5 is an enlarged schematic diagram of portion B shown in FIG. 3.
Figure 6:
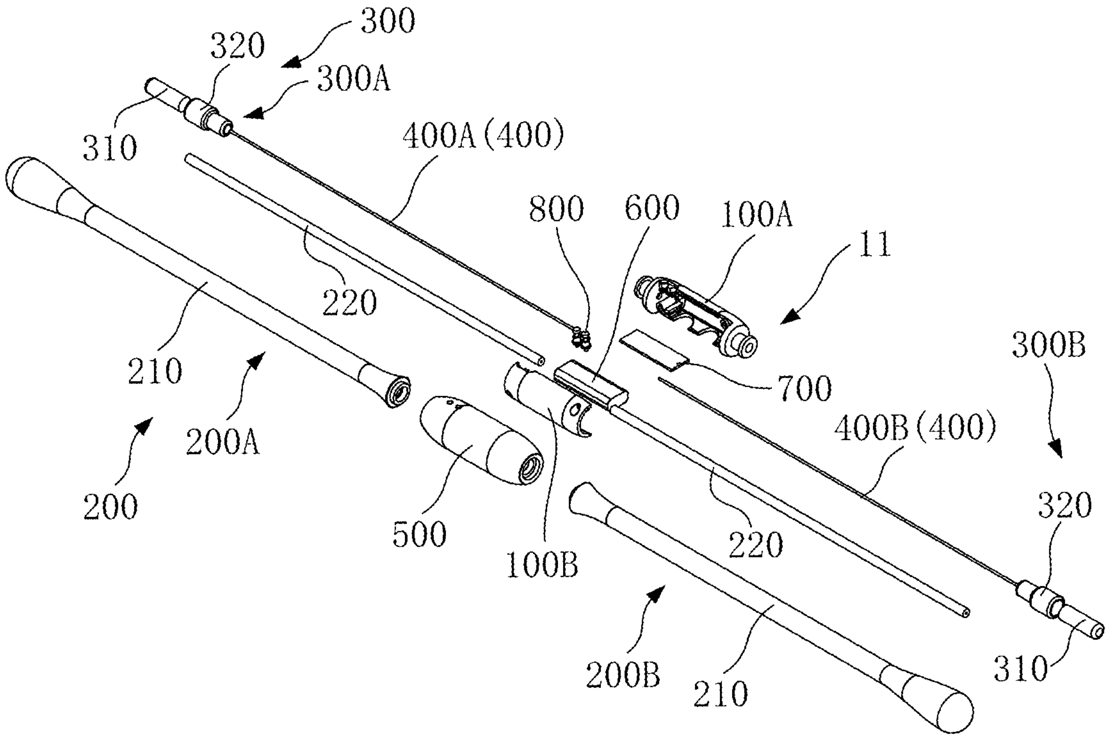
FIG. 6 is an exploded schematic diagram of the massager according to the first embodiment of the present disclosure.
Figure 7:
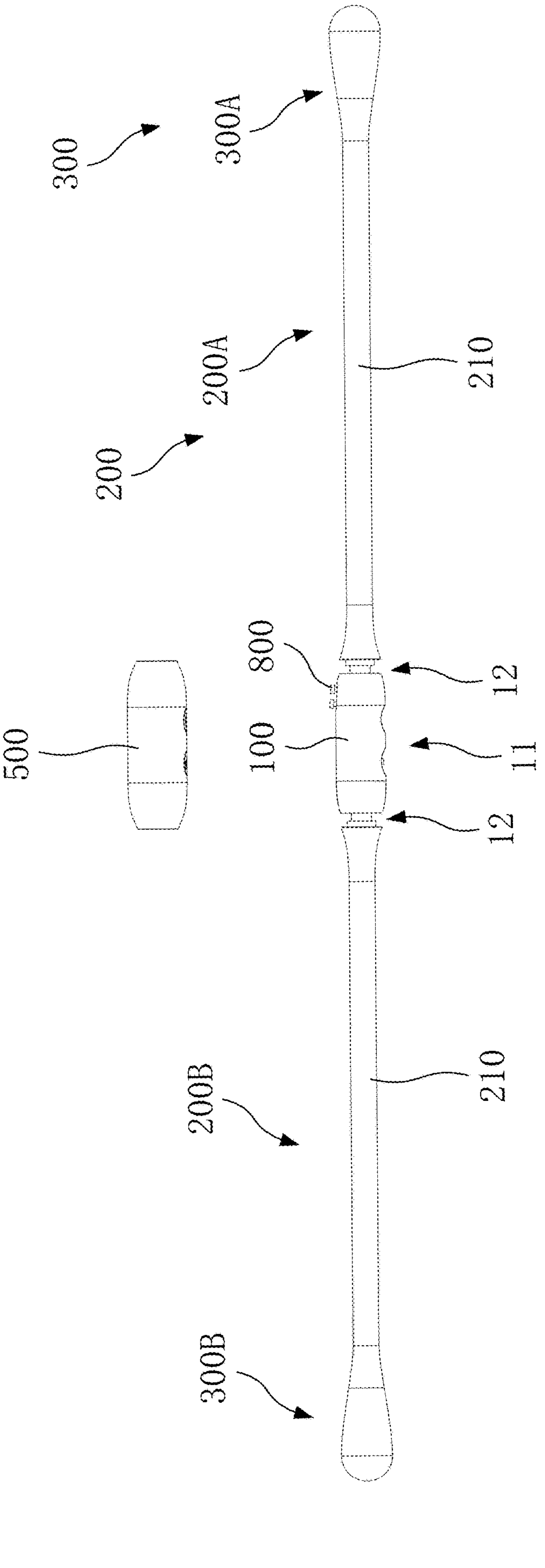
FIG. 7 is another exploded schematic diagram of the massager according to the first embodiment of the present disclosure.
Figure 8:
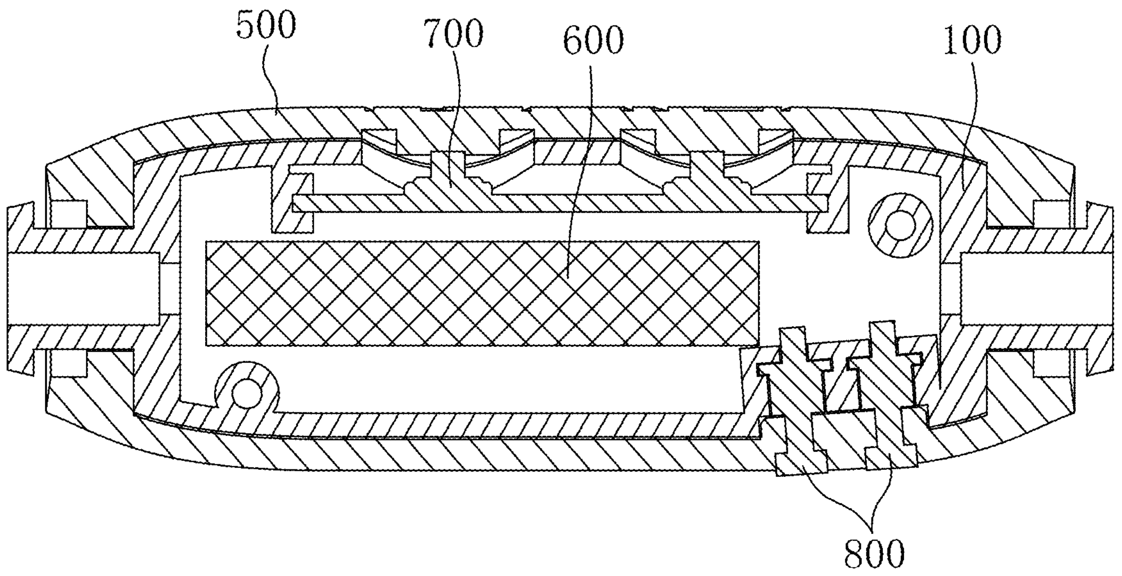
FIG. 8 is a cross-sectional schematic diagram of a master controller and a sealing sleeve of the massager according to the first embodiment of the present disclosure.
Figure 9:
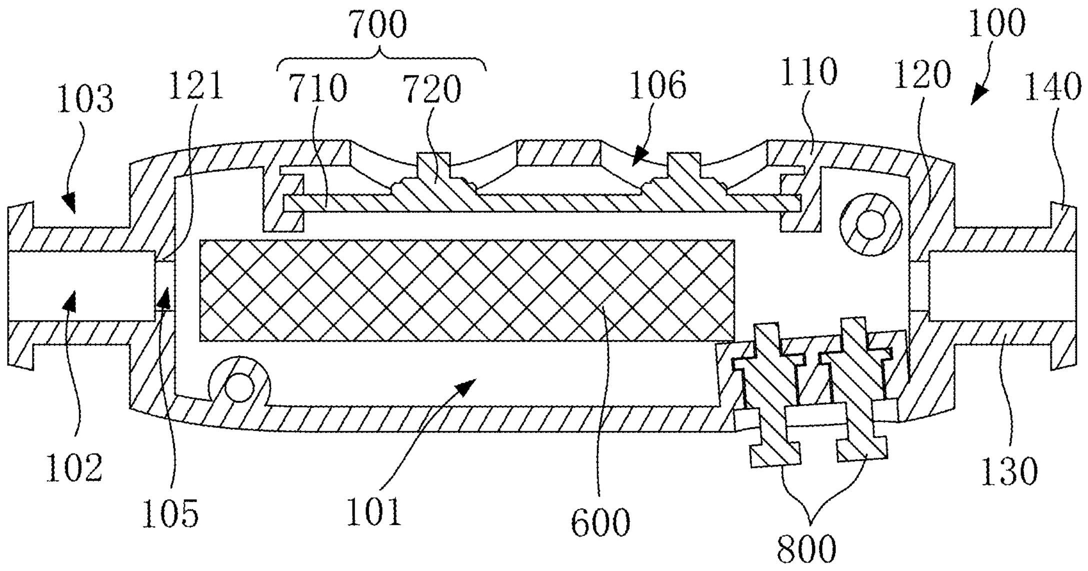
FIG. 9 is a cross-sectional schematic diagram of the master controller of the massager according to the first embodiment of the present disclosure.
Figure 10:
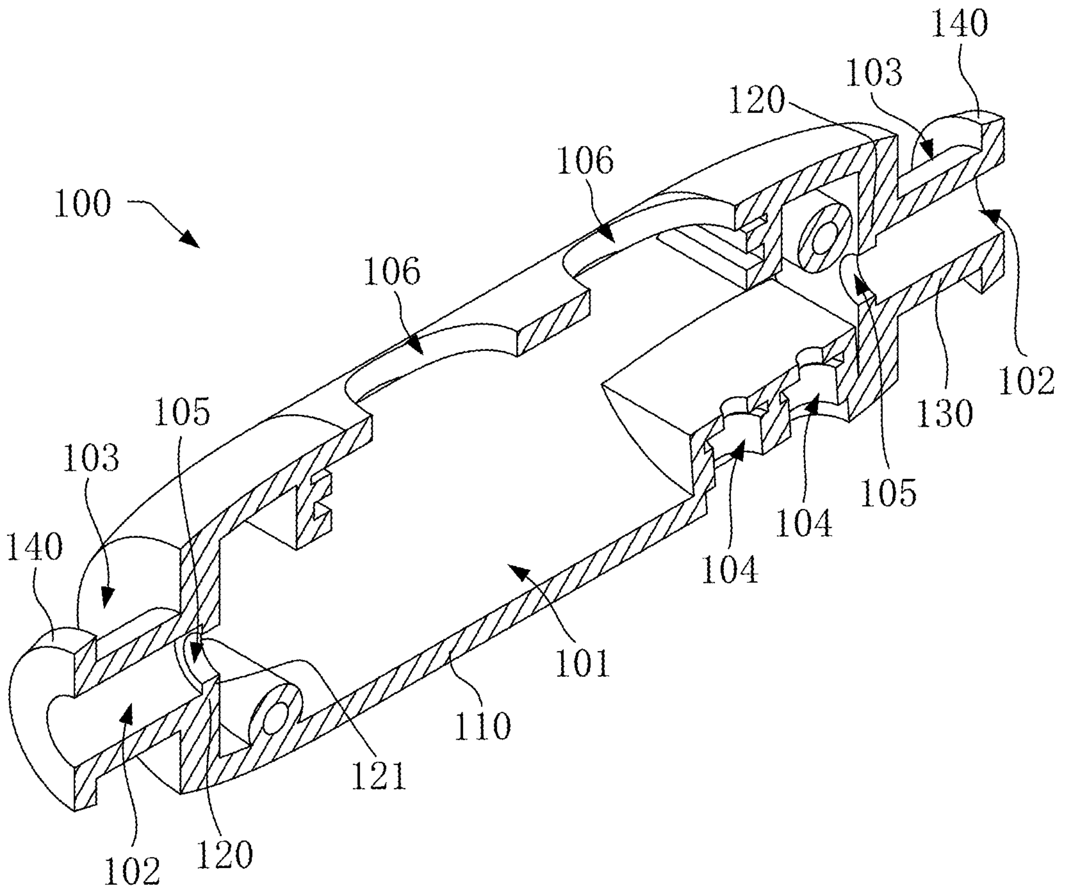
FIG. 10 is a cross-sectional schematic diagram of a housing of the massager according to the first embodiment of the present disclosure.
Figure 11:
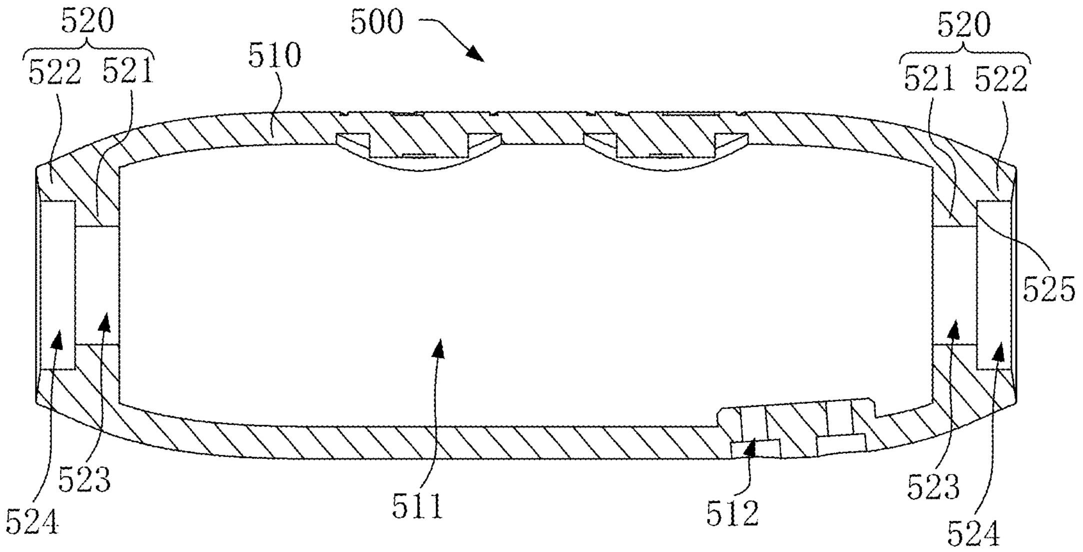
FIG. 11 is a cross-sectional schematic diagram of the sealing sleeve of the massager according to the first embodiment of the present disclosure.
Figure 12:
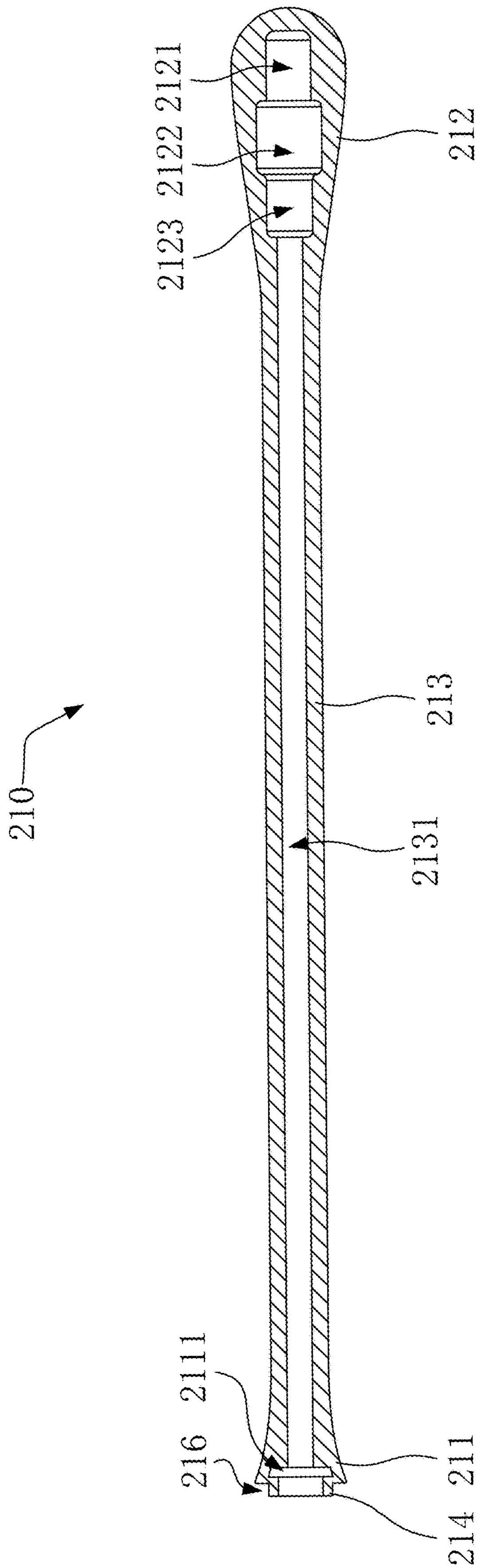
FIG. 12 is a cross-sectional schematic diagram of an outer deformable component of the massager according to the first embodiment of the present disclosure.
Figure 13:
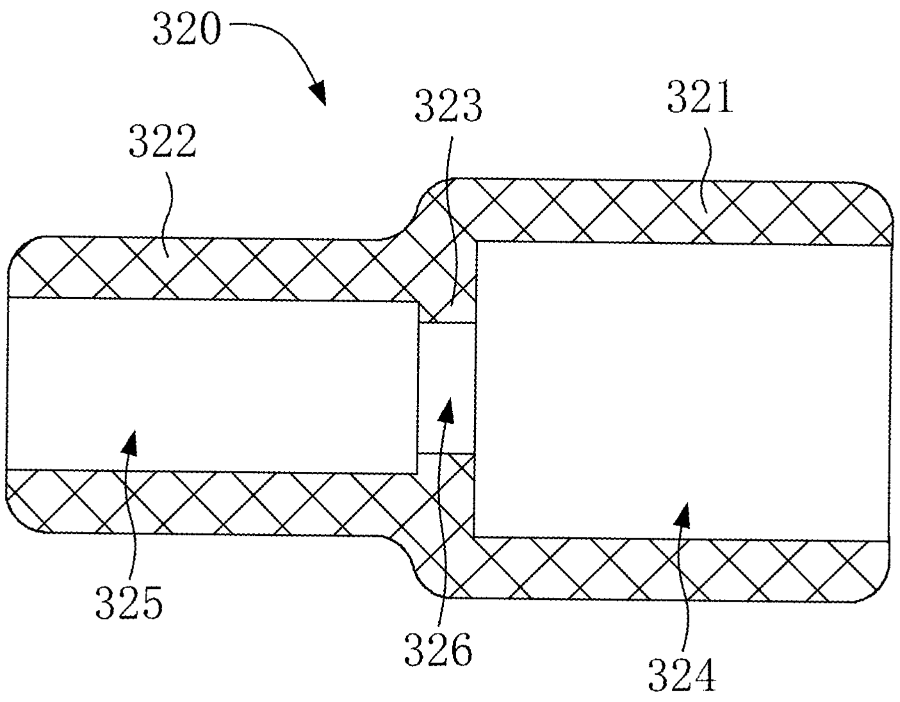
FIG. 13 is a cross-sectional schematic diagram of a sleeve of the massager according to the first embodiment of the present disclosure.
Figure 14:
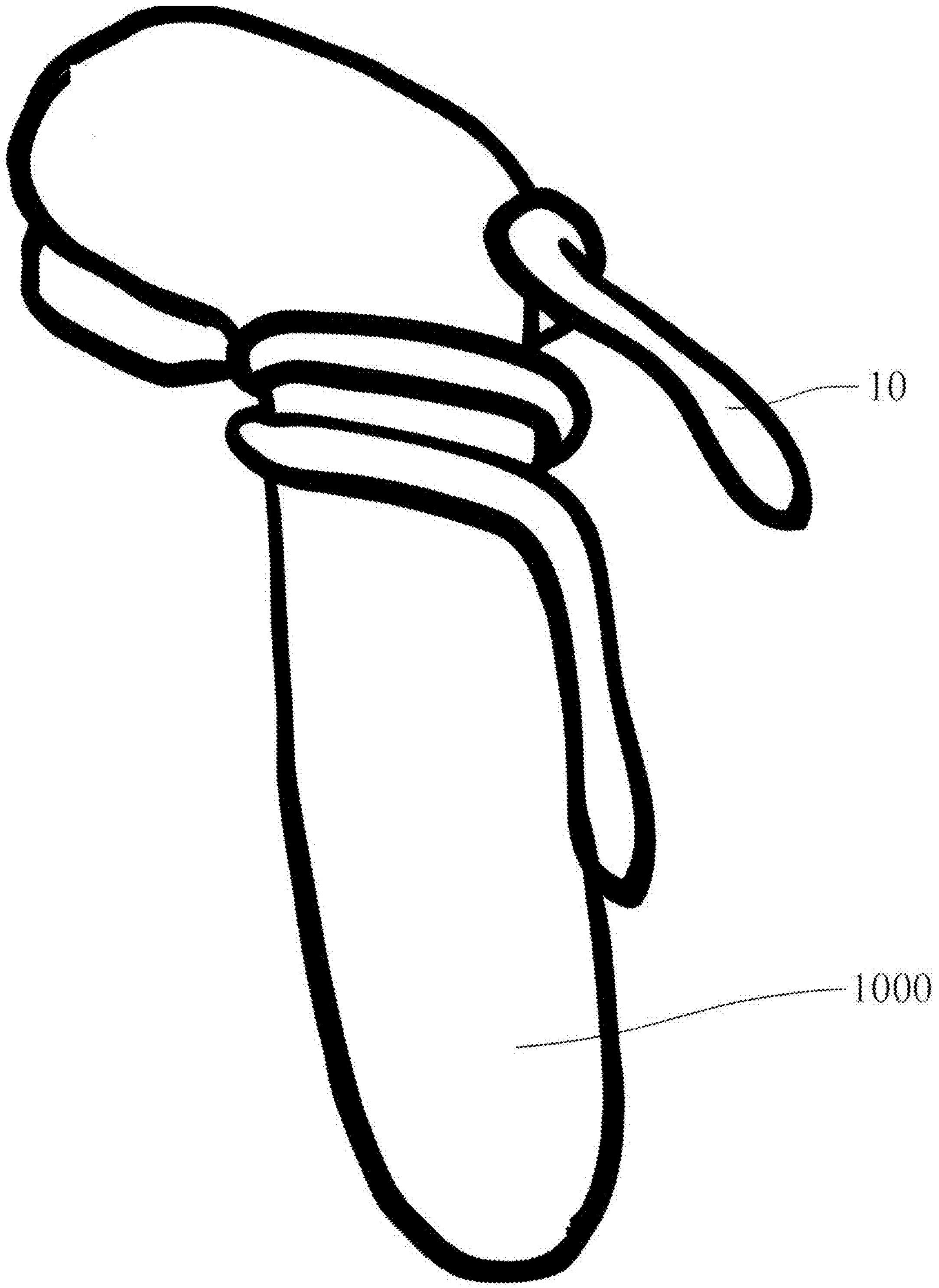
FIG. 14 is a schematic diagram of the massager shown in a first configured of use.
Figure 15:
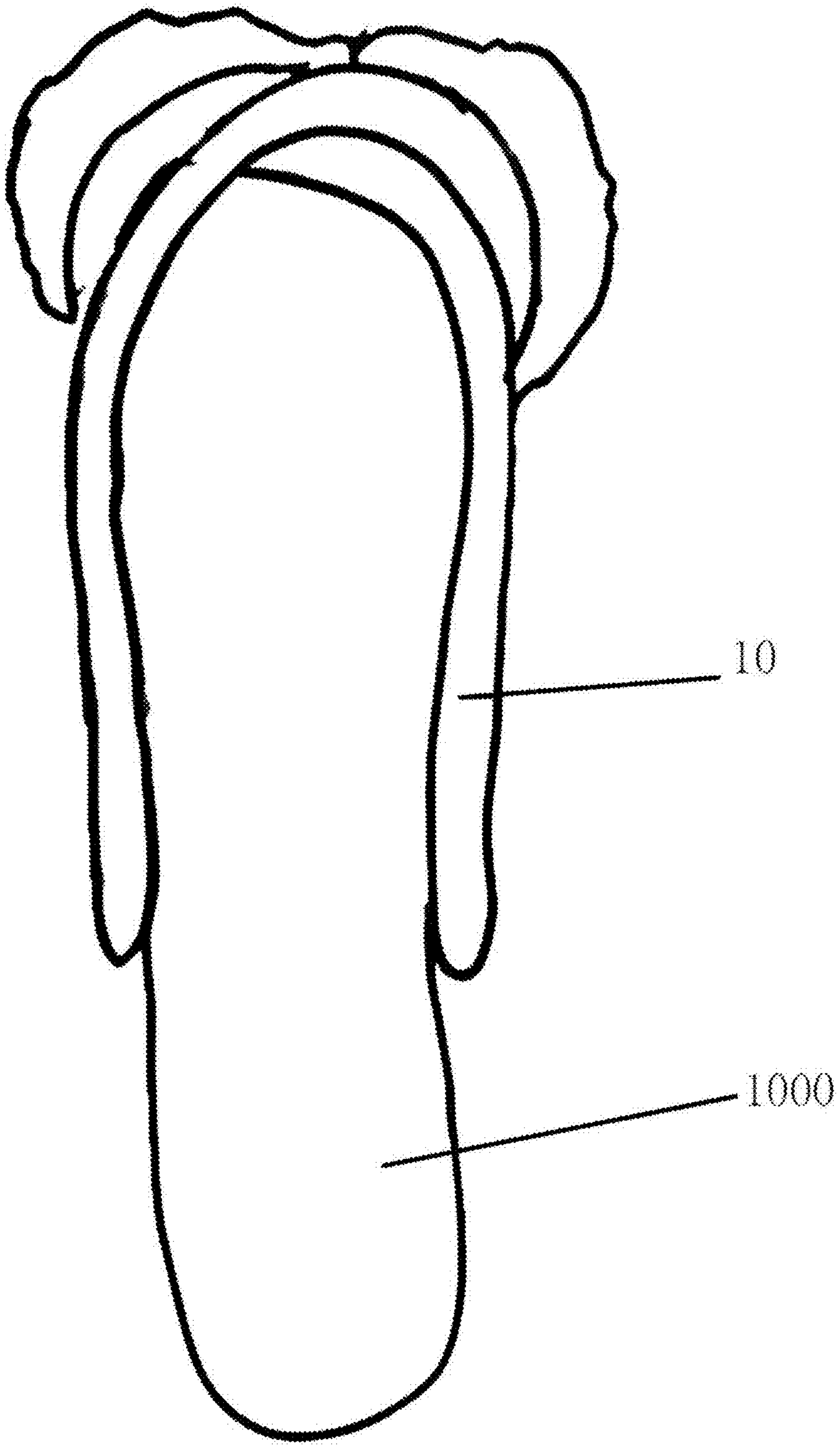
FIG. 15 is a schematic diagram of the massager shown in a second configured of use.
Figure 16:
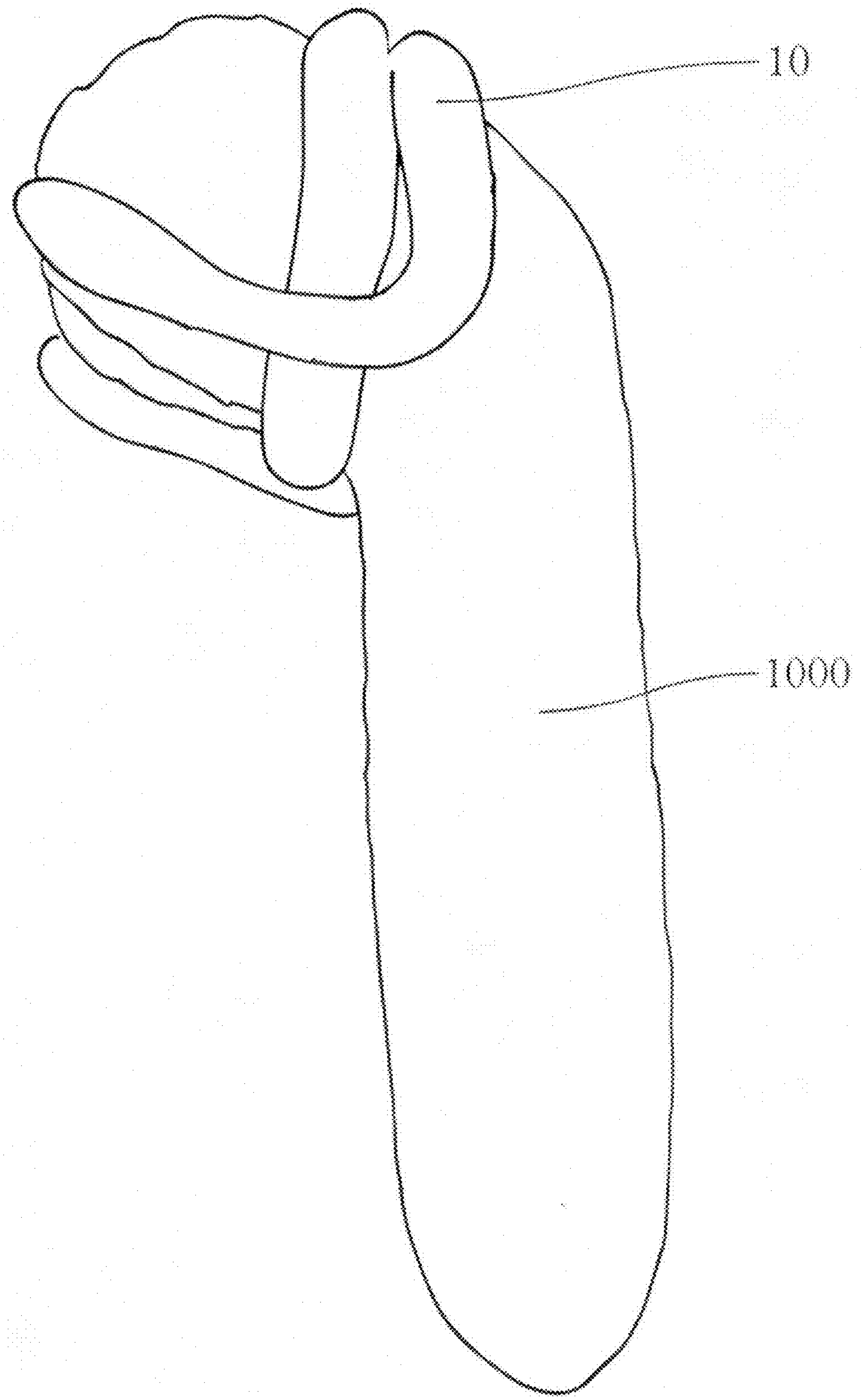
FIG. 16 is a schematic diagram of the massager shown in a third configured of use.
Figure 17:
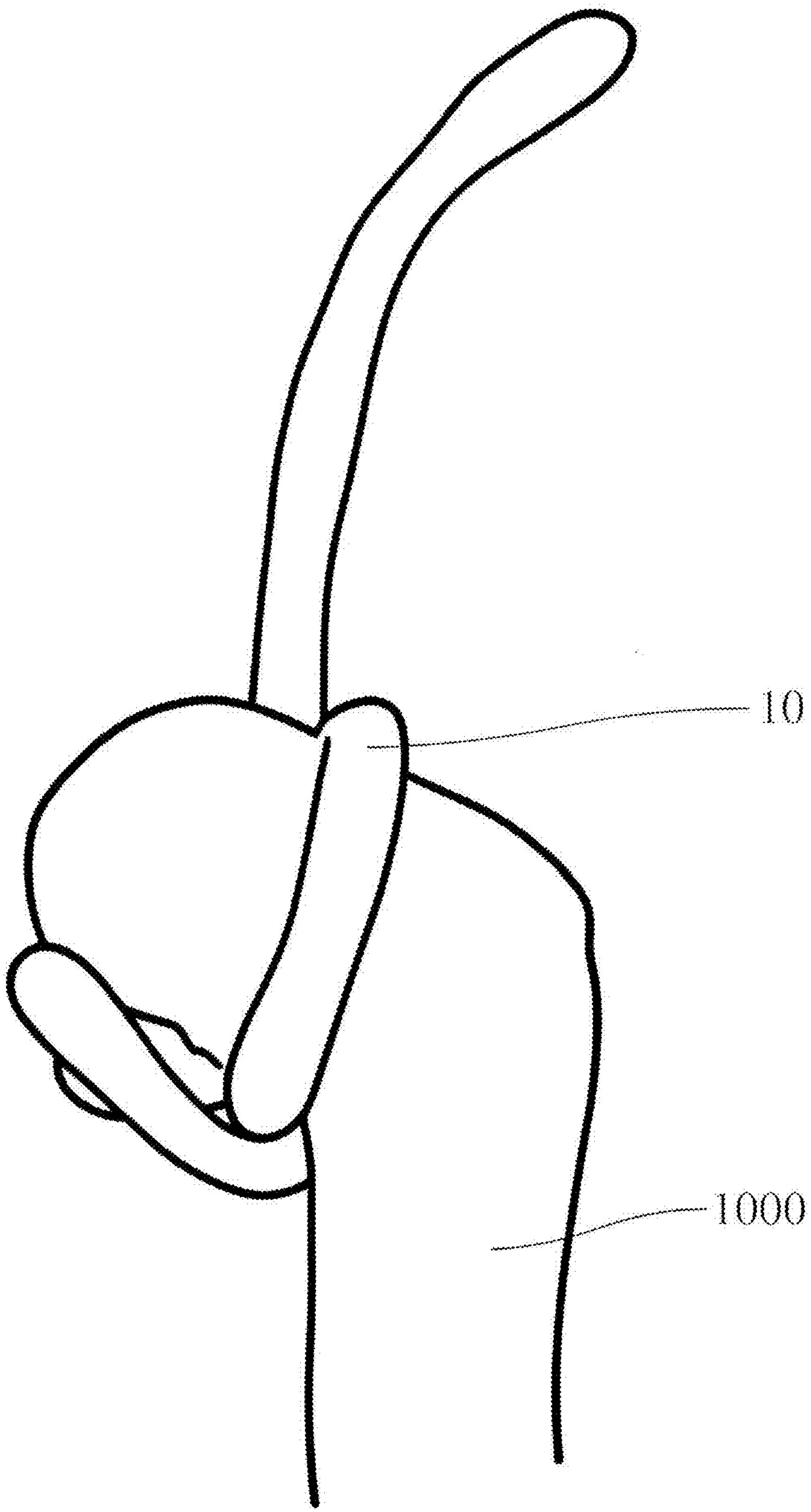
FIG. 17 is a schematic diagram of the massager shown in a fourth configured of use.

The initial state of the at least one deformable body 200 may refer to that shown in FIG. 1 and FIG. 2.

The massager 10 of the embodiment of the present disclosure is allowed to be served as a vibrating cock ring. For example, the at least one deformable body 200 is able to be wrapped around penises of different sizes and is suitable for different groups of people. A shape of the at least one deformable body 200 is adjusted according to needs of different groups of people to match with the penises of different sizes and enhance a user experience.

The massager 10 of the embodiment of the present disclosure is allowed to be served as a medical support device. For example, during anal or vaginal treatment, the at least one deformable body 200 of the massager 10 supports and opens the anus or vagina of a patient, making it easier for a doctor to perform examination and treatments. Similarly, the at least one deformable body 200 is adjusted to adapt to different patients, thereby meeting the needs of different patients.

The massager 10 of the embodiment of the present disclosure is further configured to massage different organs of the user. For example, when the at least one deformable body comprises two deformable bodies, and when the at least one vibrating assembly comprises two vibrating assemblies, the two vibrating assemblies 300 on the two deformable bodies 200 are allowed to massage two nipples of the user. For another example, a first vibrating assembly 300 is configured to massage the penis, while a second vibrating assembly 300 is configured to massage the anus.

It should be noted that application scenarios of the massager 10 of the embodiment of the present disclosure are not limited to the above examples FIGS. 14-17 provide some application scenarios of the massager 10 according to the embodiment of the present disclosure. FIGS. 14-17 illustrate different deformed states of the two deformable bodies 200, and FIGS. 14-17 illustrate the application scenarios where the two deformable bodies 200 are wound on the penis 1000.

Specifically, the number of the at least one deformable body 200 is the same as the number of the at least one vibrating assembly 300 of the massager 10. For example, there are two deformable bodies 200 in the embodiment of the present disclosure, which are respectively a first deformable body 200A and a second deformable body 200B. There are two vibrating assemblies 300 in the embodiment of the present disclosure, which are respectively the first vibrating assembly 300A and the second vibrating assembly 300B. It should be noted that the number of the at least one deformable body 200 and the number of the at least one vibrating assembly 300 in the embodiment of the present disclosure are not limited thereto. In other optional embodiments, a plurality of vibrating assemblies 300 are disposed in each deformable body 200. Specifically, the term "plurality" is understood as at least two.

In one optional embodiment, the massager 10 further comprises a master controller 11.

The two deformable bodies 200 are connected to the master controller 11. The two deformable bodies 200 are respectively disposed on two ends of the master controller 11. Further, two ends of each deformable body are respectively connected to the master controller and a corresponding vibrating assembly 300.

The master controller 11 comprises a housing 100 and a power supply component 600. The power supply component

600 is disposed in the housing 100. The power supply component 600 is electrically connected to electrical components in the massager 10, such as the two vibrating assemblies 300. The power supply component 600 is configured to provide electrical energy to the electrical components in the massager 10, such as the two vibrating assemblies 300. The power supply component 600 is a lithium battery.

In one optional embodiment, the massager 10 further comprises at least one wire 400. The number of the at least one wire 400 is the same as the number of the at least one vibrating assembly 300. Namely, there are two wires, which are respectively a first wire 400A and a second wire 400B. Each wire 400 is electrically connected to the power supply component 600 and a corresponding vibrating assembly 300. Specifically, the first wire 400A is electrically connected to the power supply component 600 and the first vibrating assembly 300A, and the second wire 400B is electrically connected to the power supply component 600 and the second vibrating assembly 300B.

In one optional embodiment, the master controller 11 further comprises a control component 700. The control component 700 is disposed in the housing 100. The control component 700 is electrically connected to the two vibrating assemblies 300 and the power supply component 600. The control component 700 and the power supply component 600 are electrically connected via another wire. The control component 700 and the two vibrating assemblies 300 are electrically connected through the two wires 400. The power supply component 600 is indirectly connected to the two vibrating assemblies 300 through the control component 700. The power supply component 600 provides power to the control component 700 and also supplies power to other electrical components, such as the two vibrating assemblies 300, through the control component 700.

Optionally, the control component 700 comprises a control main board 710 and an operating switch 720 disposed on the control main board 710. The control main board 710 is disposed in the housing 100, and the operating switch 720 passes through the housing 100. For example, the housing 100 comprises a through hole 106, and the operating switch 720 is at least partially accommodated in the through hole 106. The operating switch 720 is exposed through the through hole 106. The user is able to press the operating switch 720 to control the electrical components of the massager 10, such as a state of the two vibrating assemblies 300.

In one optional embodiment, a state of the two vibrating assemblies 300 comprises an operating state and an inoperative state. In another alternative embodiment, a state of the two vibrating assemblies 300 comprise a first power vibration state and a second power vibration state. A vibration frequency of the two vibrating assemblies 300 in the first power vibration state is less than a vibration frequency of the two vibrating assemblies 300 in the second power vibration state. In another alternative embodiment, the state of the two vibrating assemblies 300 is further divided into a state of the first vibrating assembly 300A and a state of the second vibrating assembly 300B. In the embodiment, the operating switch 720 is configured to control an operating state of the first vibrating assembly 300A and an operating state of the second vibrating assembly 300B respectively. For example, the operating switch 720 is able to control the first vibrating assembly 300A to be in the operating state and the second vibrating assembly 300B to be in an inoperative state. In another example, the operating switch 720 is able to control both the first vibrating assembly 300A and the second vibrating assembly 300B to be in the operating state or the inoperative state. In another example, the operating switch 720 is able to control the first vibrating assembly 300A to be in the inoperative state and the second vibrating assembly 300B to be in the operating state.

The two deformable bodies 200 are physically connected to the housing 100. Each deformable body 200 comprises an outer deformable component 210 and an internal deformable component 220. Each outer deformable component 210 is made of a non-metal material. Each vibrating assembly 300 is completely disposed in and wrapped by a corresponding outer deformable component 210. Each internal deformable component 220 is at least partially disposed in a corresponding outer deformable component 210. Each outer deformable component 210 at least partially wraps a corresponding internal deformable component 220. Each wire 400 is partially disposed in and partially wrapped by a corresponding outer deformable component 210.

Each deformable body 200 is deformable, and each internal deformable component 220 maintains a current deformed state of each deformable body 200 after each deformable body 200 is deformed. The current deformed state of each deformable body 200 may refer to FIGS. 14-17.

Specifically, each wire 400 is partially disposed in and partially wrapped by a corresponding internal deformable component 220.

Specifically, each wire 400, the corresponding internal deformable component 220, and the corresponding outer deformable component 210 are disposed from inside to outside and are coaxially disposed.

Specifically, the housing 100 comprises a main body portion 110, at least one transition portion 120 and at least one mounting portion 130. In the embodiment, the number of the at least one transition portion 120 and the number of the at least one mounting portion 130 is the same as the number of the at least one deformable body 200. Namely, the housing 100 comprises two transition portions 120 and two mounting portions 130. The main body portion 110, a corresponding transition portion 120 and a corresponding mounting portion 130 are connected in sequence. The main body portion 110 and the two transition portions 120 jointly define a first mounting space 101. Each mounting portion 130 defines a second mounting space 102. Each transition portion 120 defines a mounting hole 105. Each mounting hole 105 is disposed between the first mounting space 101 and a corresponding second mounting space 102, and each mounting hole 105 is communicated with the first mounting space 101 and the corresponding second mounting space 102.

The power supply component 600 and the control main board 710 of the control component 700 are disposed in the first mounting space 101. Each wire 400 passes through the housing 100 and is electrically connected to the power supply component 600, and each wire 400 is electrically connected to the corresponding vibrating assemblies 300. Specifically, each wire 400 passes through a corresponding second mounting space 102 and a corresponding mounting hole 105 and is electrically connected to the power supply component 600 disposed in the first mounting space 101. More specifically, each wire 400 passes through the corresponding second mounting space 102 and the corresponding mounting hole 105 to be electrically connected to the control main board 710 disposed in the first mounting space 101. That is, each wire 400 is indirectly connected to the power supply component 600 through the control main board 710.

Each internal deformable component 220 is partially disposed in a corresponding second mounting space 102 and is limited by a limiting structure 121 of a corresponding transition portion 120. Each limiting structure 121 is disposed between the first mounting space 101 and a corresponding second mounting space 102. Each limiting structure 121 is disposed around a corresponding mounting hole 105, and each limiting structure 121 is configured to partially limit each internal deformable component 220 in the corresponding second mounting space 102. In this way, each internal deformable component 220 is unable to enter a corresponding mounting hole 105 and the first mounting space 101.

In one optional embodiment, each outer deformable component 210 comprises a first connecting portion 211, a second connecting portion 212, and a deformable portion 213. For each outer deformable component 210, the first connecting portion 211 thereof, the deformable portion 213 thereof, and the second connecting portion 212 thereof are connected in sequence, the first connecting portion 211 thereof is connected to the housing 100, the second connecting portion 212 thereof wraps a corresponding vibrating assembly 300.

Furthermore, an outer diameter of a portion of each deformable body 200 disposed between the master controller 11 and the corresponding vibrating assembly 300 is less than an outer diameter of a portion of each deformable body 200 enclosing the corresponding vibrating assembly 300 and an outer diameter of the master controller 11. Moreover, the outer diameter of each deformable portion 213 is less than an outer diameter of each first connecting portion 211 and an outer diameter of each second connecting portion 212. The outer diameter of each deformable portion 213, the outer diameter of each first connecting portion 211, and the outer diameter of each second connecting portion 212 are understood as diameters of their outer surfaces.

Specifically, the outer diameter of each first connecting portion 211 varies. For example, the outer diameter of each first connecting portion 211 varies continuously, and the outer diameter of each first connecting portion 211 gradually decreases from a first end thereof away from the deformable portion 213 toward a second end thereof connected to the deformable portion 213.

Specifically, the outer diameter of each second connecting portion 212 varies. For example, the outer diameter of each second connecting portion 212 varies continuously, and the outer diameter of the second connecting portion 212 first gradually increases and then gradually decreases from a first end thereof away from the deformable portion 213 toward a second end thereof connected to the deformable portion 213.

In one optional embodiment, each deformable body 200 is physically connected to the housing 100, that is, each outer deformable component 210 is physically connected to the housing 100, and each internal deformable component 220 is physically connected to the housing 100, thereby improving the stability of the physical connection between the housing 100 and each deformable body 200. Optionally, a fixing groove 2111 is defined in an inner side surface of each first connecting portion 211. The housing 100 comprises at least one fixing structure 140, and each fixing structure 140 is disposed in a corresponding fixing groove 2111.

Specifically, an outer diameter of each fixing structure 140 gradually increases from a tail end thereof to a head end thereof, so that each fixing structure 140 is allowed to be plugged into the corresponding fixing groove 2111 from an end portion of a corresponding first connecting portion 211. During assembly, each fixing structure 140 is first aligned with an opening of a corresponding outer deformable component 210. Then, each fixing structure 140 is compressed, causing each first connecting portion 211 to deform and be plugged into a corresponding fixing structure 140.

Each internal deformable component 220 and the housing 100 are physically connected by plugging each internal deformable component 220 into the corresponding second mounting space 102. Each internal deformable component 220 is attached to an inner surface of a corresponding mounting portion 130 that forms the corresponding second mounting space 102.

In one optional embodiment, the massager 10 further comprises a sealing sleeve 500, and the sealing sleeve 500 wraps an outer surface of the housing 100 and partially covers each outer deformable component 210 to seal a connection joint of the housing 100 and each outer deformable component 210.

Specifically, the fixing structure 140 is disposed on an outer side surface of one end of each mounting portion 130 away from the corresponding transition portion 120. A third mounting space 103 is defined between each fixing structure 140 and the corresponding transition portion 120.

The sealing sleeve 500 comprises a first sealing portion 510 and at least one second sealing portion 520. The first sealing portion 510 is connected to the at least one second sealing portion 520. The first sealing portion 510 wraps the main body portion 110 and each transition portion 120 of the housing 100. The number of the at least one second sealing portion 520 is the same as the number of the at least one deformable body. Each second sealing portion 520 comprises a first ring structure 521 and a second ring structure 522, and the first ring structure 521 thereof is disposed on an inner side of the second ring structure 522 thereof. An inner diameter of each first ring structure 521 is greater than an inner diameter of each second ring structure 522. Each first ring structure defines a first sealing space 523, and each second ring structure defines a second sealing space 524. For each second sealing portion, a step surface 525 is defined between the first ring structure 521 thereof and the second ring structure 522 thereof. Each first sealing portion 510 defines an accommodating space 511, in which the main portion 110 and the two transition portions 120 of the housing 100 are disposed.

Each outer deformable component 210 comprises a plugging portion 214, and each plugging portion 214 thereof is disposed at one end of the first connecting portion 211 thereof away from the deformable portion 213 thereof. Each plugging portion 214 thereof is disposed in a corresponding second sealing space 524, and each plugging portion 214 is disposed in a corresponding third mounting space 103. Each second ring structure 522 wraps a corresponding plugging portion 214. A fixed space 216 is defined between each plugging portion 214 and the corresponding first connecting portion 211. A portion of each second ring structure 522 is disposed in a corresponding fixed space 216.

Optionally, an end surface of each plugging portion 214 away from the corresponding first connecting portion 211 abuts against a corresponding step surface 525. A first portion of an end surface of each first connecting portion 211 is connected to a corresponding plugging portion 214, and a second portion of the end surface of each first connecting portion 211 abuts against an outer end surface of a corresponding second ring structure 522.

In the embodiment, the sealing sleeve 500 covers each connection point 12 between the housing 100 and each outer deformable component 210. The sealing sleeve 500 is further connected to each outer deformable component 210, enhancing the stability and sealing performance of a connection of the sealing sleeve 500, the housing 100, and the two outer deformable components 210.

Each outer deformable component 210 is made of flexible silicone.

Optionally, each internal deformable component 220 is made of a metal hose. In this way, each internal deformable component 220 is able to maintain the current deformed state after deformation.

Each outer deformable component 210 is made of flexible silicone, which acts as a buffer for each internal deformable component 220 made of the metal hose. Each outer deformable component 210 further provides cushioning when in contact with the skin or organs of the user. It should be noted that in the embodiment, each wire 400 is disposed within the corresponding internal deformable component 220 made of the metal hose. Each internal deformable component 220 made of the metal hose protects the corresponding wire 400 therein, preventing the corresponding wire 400 from breakage caused by frequent deformation, such as bending. In other optional embodiments, each wire 400 is disposed within the corresponding outer deformable component 210 together with the corresponding internal deformable component 220.

In one optional embodiment, the massager 10 defines a length direction F1 in an initial state, a length of each deformable body 200 in the initial state along the length direction F1 is L1, a length of the master controller 11 along the length direction F1 is L2. A length of each vibrating assembly 300 along the length direction F1 is L3. $L3 \leq L2$, and $L1 \geq L2+L3$.

Specifically, the two deformable bodies 200 are connected at two opposite ends of the master controller 11, or the two deformable bodies 200 form an angle greater than 45° and less than 180° relative to the master controller 11. For example, the first deformable body 200A and the second deformable body 200B are disposed at two opposite ends of the master controller 11.

Furthermore, the lengths of the deformable bodies 200 are the same or different. For example, a length of the first deformable body 200A is the same as a length of the second deformable body 200B.

In one optional embodiment, each vibrating assembly 300 comprises a vibrating component 310 and a sleeve 320.

Each sleeve 320 comprises a first sleeving portion 321, a second sleeving portion 322, and a stopping structure 323. In each sleeve 320, the first sleeving portion 321 thereof defines a first sleeving space 324, the second sleeving portion 322 thereof defines a second sleeving space 325, the stopping structure 323 thereof is disposed on an inner side surface of a connecting junction of the first sleeving portion 321 and the second sleeving portion 322, and the stopping structure 323 thereof defines a through hole 326. In each vibrating assembly 300, a first portion of the vibrating component 310 thereof is disposed in the first sleeving space 324 thereof, and a second portion of the vibrating component 310 thereof extends from one end of the first sleeving portion 321 thereof away from the second sleeving portion 322 thereof to an outside of the first sleeving portion 321 thereof, and the first portion of the vibrating component 310 thereof disposed in the first sleeving space 324 is stopped by the stopping structure 323 thereof. A portion of each internal deformable component 220 is disposed in a corresponding second sleeving space 325 and is stopped by a corresponding stopping structure 323. One end of each inner deformable component 220 away from the master controller 11 is plugged into the corresponding second sleeving space 325 in a corresponding first sleeving portion 321 from an opening of a corresponding second sleeving portion 322. For example, an outer surface of each inner deformable component 220 is in contact with an inner surface of the corresponding second sleeving portion 322. Each wire 400 passes through a corresponding second sleeving space 325 and a corresponding through hole 326 of the sleeve 320 and is electrically connected to the corresponding vibrating component 310 disposed in the corresponding first sleeving space 324.

Specifically, an inner diameter of each first sleeving portion 321 is greater than an inner diameter of each second sleeving portion 322, and the inner diameter of each second sleeving portion 322 is greater than an inner diameter of each stopping structure 323.

Specifically, each outer deformable component 210 is injection molded around the corresponding vibrating assembly 300, so that each outer deformable component 210 is connected to a periphery of the corresponding vibrating assembly 300. For instance, each outer deformable component 210 is injection molded around the corresponding vibrating assembly 300 to define a plurality of spaces. Specifically, the second connecting portion 212 of each outer deformable component 210 defines a first injection molding space 2121, a second injection molding space 2122, and a third injection molding space 2123. A portion of each vibrating component 310 is disposed in a corresponding first injection molding space 2121. Each first sleeving portion 321 is disposed in a corresponding second injection molding space 2122. Each second sleeving portion 322 is disposed in a corresponding second injection molding space 2122. A diameter of each first injection molding space 2121 and a diameter of each third injection molding space 2123 are less than a diameter of each second injection molding space 2122.

Each deformable portion 213 defines a channel 2131 communicated with a corresponding third injection molding space 2123 and a corresponding fixing groove 2111.

In one optional embodiment, the master controller 11 further comprises at least two charging terminals 800. A first end of each of the charging terminals 800 is electrically connected to the power supply component 600. The at least two charging terminals 800 are configured to charge the power supply component 600. A second end of each of the charging terminals 800 is exposed.

The housing 100 defines through holes 104 for the at least two charging terminals 800 to pass through. The sealing sleeve 500 defines through holes 512 for the at least two charging terminals 800 to pass through. The at least two charging terminals 800 are sealed between the housing 100 and the sealing sleeve 500.

In one optional embodiment, the housing 100 may be a single housing or comprise at least two shells. For example, the housing 100 comprises a first shell 100A and a second shell 100B. The first shell 100A and the second shell 100B are detachably connected. Namely, the first shell 100A and the second shell 100B are able to be connected together or separated from each other. For example, the first shell 100A and the second shell 100B are connected by screws.

Figure 18:
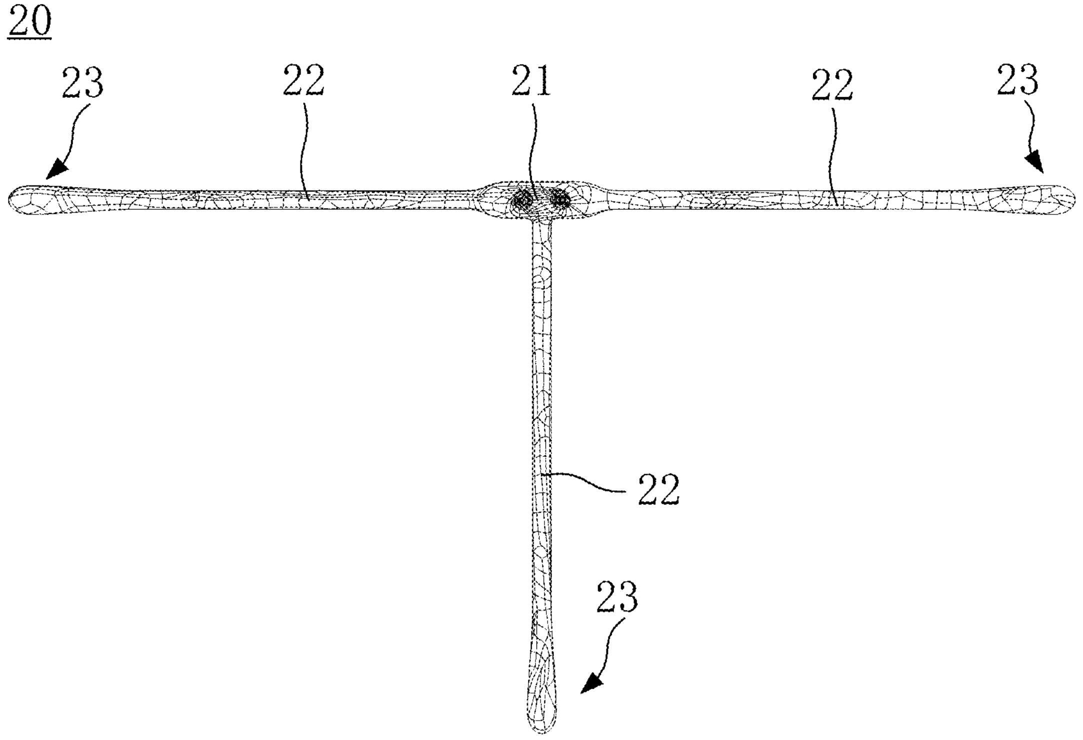
FIG. 18 is a schematic diagram of the massager according to a second embodiment of the present disclosure.

In another alternative embodiment, as shown in FIG. 18, a massager 20 comprises a master controller 21, three deformable bodies 22, and three vibrating assemblies 23. The three vibrating assemblies 23 are one-to-one disposed within the three deformable bodies 22, and the three deformable bodies 22 are connected to different positions of the master controller 21. The master controller 21 may refer to the master controller 11, each deformable body 22 is the same as each deformable body 200, and each vibrating assembly 23 is the same as each vibrating assembly 300. Details are omitted herein. Specifically, the massager 20 has an overall T-shaped structure.

Figure 19:
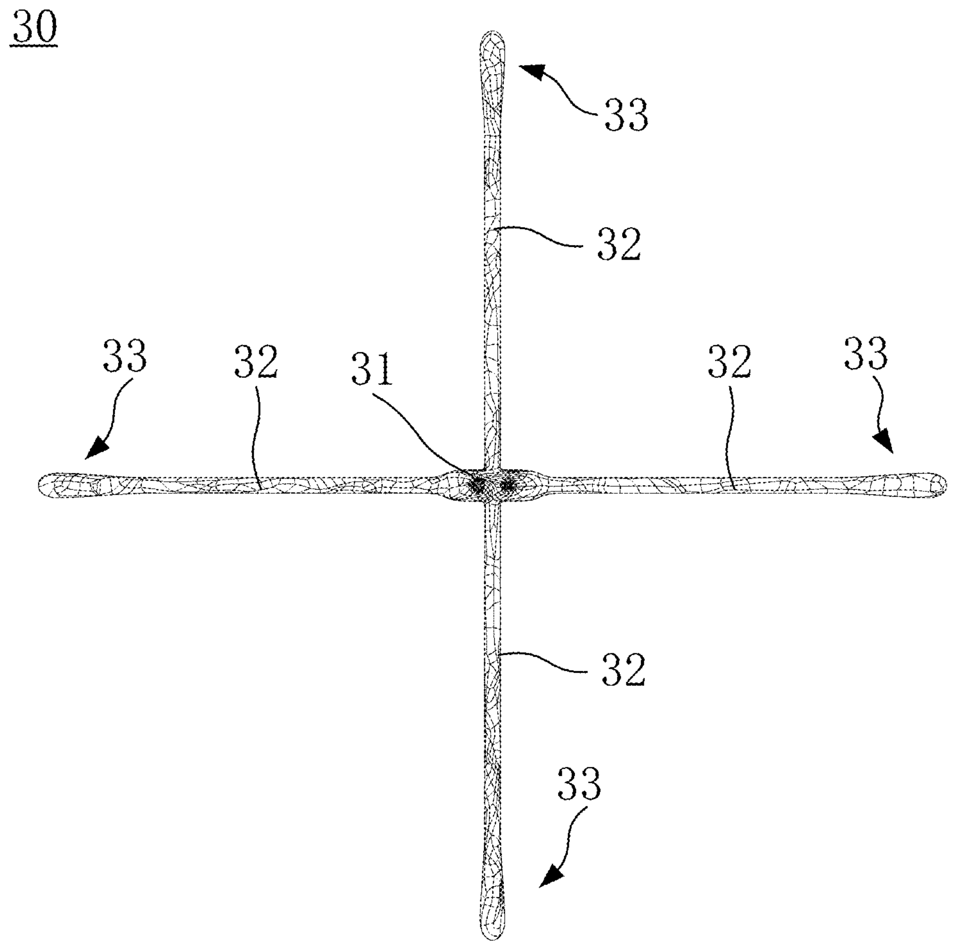
FIG. 19 is a schematic diagram of the massager according to a third embodiment of the present disclosure.

In another alternative embodiment, as shown in FIG. 19, a massager 30 comprises a master controller 31, four deformable bodies 32, and four vibrating assemblies 33. The four vibrating assemblies 33 are one-to-one disposed within the four deformable bodies 32, and the four deformable bodies 32 are connected to different positions of the master controller 31. The master controller 31 may refer to the master controller 11. Each deformable body 32 is the same as each deformable body 200, and each vibrating assembly 33 is the same as each vibrating assembly 300. Details are omitted herein. Specifically, the massager 30 has an overall cross shape.

Figure 20:
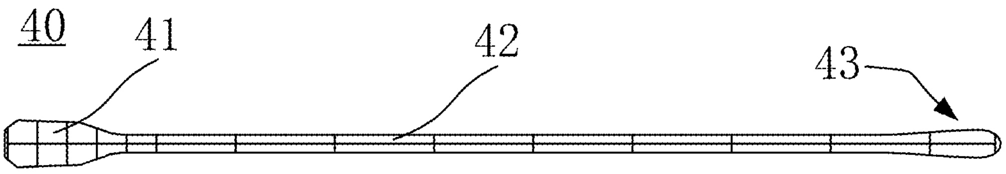
FIG. 20 is a schematic diagram of the massager according to a fourth embodiment of the present disclosure.

In another alternative embodiment, as shown in FIG. 20, a massager 40 comprises a master controller 41, a deformable body 42, and a vibrating assembly 43. The vibrating assembly 43 is disposed within the deformable body 42. The deformable body 42 is connected to the master controller 41. The master controller 41 may refer to the master controller 11. The deformable body 42 may refer to each deformable body 200, such as the first deformable body 200A. The vibrating assembly 43 may refer to each vibrating assembly 300, such as the first vibrating assembly 300A. Details are omitted herein. Specifically, the massager 40 is generally elongated.

The above embodiments of the present disclosure provide a detailed illustration of the massager. In the present disclosure, specific embodiments are applied to illustrate the principles and implementations of the present disclosure. The above description of the embodiments is only used to better understand methods and core ideas of the present disclosure. Meanwhile, according to the ideas of the present disclosure, changes are made in the specific implementations and the application scope by those skilled in the art. Therefore, the contents of the specification should not be regarded as a limitation of the present disclosure.

What is claimed is:

1. A massager, comprising:

a master controller;

at least one deformable body;

at least one vibrating assembly; and at least one wire;

wherein the master controller comprises a housing and a power supply component, the power supply component is disposed in the housing, the at least one wire passes through the housing and is electrically connected to the power supply component, and the at least one wire is electrically connected to the at least one vibrating assembly;

wherein the at least one deformable body is physically connected to the housing;

the at least one deformable body comprises an outer deformable component and an internal deformable component, the outer deformable component is made of a non-metal material, the at least one vibrating assembly is completely disposed in and is wrapped by the outer deformable component, the internal deformable component is at least partially disposed in the outer deformable component, the outer deformable component at least partially wraps the internal deformable component, and the at least one wire is partially disposed in and partially wrapped by the outer deformable component;

wherein the at least one deformable body is deformable, and the internal deformable component maintains a current deformed state of the at least one deformable body after the at least one deformable body is deformed;

wherein the massager further comprises a sealing sleeve, and the sealing sleeve wraps an outer surface of the housing and partially covers the outer deformable component to seal a connection joint of the housing and the outer deformable component;

wherein the housing comprises a main body portion, at least one transition portion and at least one mounting portion, and the main body portion, the at least one transition portion and the at least one mounting portion are connected in sequence;

wherein the main body portion and the at least one transition portion jointly define a first mounting space, the at least one mounting portion defines a second mounting space, the at least one transition portion defines a mounting hole, the mounting hole is disposed between the first mounting space and the second mounting space, and the mounting hole is communicated with the first mounting space and the second mounting space;

wherein the power supply component is disposed in the first mounting space, and the at least one wire passes through the second mounting space and the mounting hole and is electrically connected to the power supply component disposed in the first mounting space;

wherein the internal deformable component is disposed in the second mounting space and is limited by a limiting structure of the at least one transition portion, a fixing structure is disposed on an outer side surface of one end of the at least one mounting portion away from the at least one transition portion, and a third mounting space is defined between the fixing structure and the at least one transition portion;

wherein the sealing sleeve comprises a first sealing portion and at least one second sealing portion, the first sealing portion is connected to the at least one second sealing portion, the first sealing portion wraps the main body portion and the at least one transition portion of the housing, the at least one second sealing portion comprises a first ring structure and a second ring structure, the first ring structure is disposed on an inner side of the second ring structure, an inner diameter of the first ring structure is greater than an inner diameter of the second ring structure, the first ring structure defines a first sealing space, and the second ring structure defines a second sealing space;

wherein the outer deformable component comprises a plugging portion, a first connecting portion, a second connecting portion, and a deformable portion; wherein the plugging portion, the first connecting portion, the deformable portion, and the second connecting portion are connected in sequence;

wherein the plugging portion is disposed in the second sealing space, and the plugging portion is disposed in the third mounting space, and the second ring structure wraps the plugging portion;

wherein a fixing groove is defined in an inner side surface of the first connecting portion, the fixing structure is disposed in the fixing groove, and the second connecting portion wraps around the at least one vibrating assembly.

2. The massager according to claim 1, wherein the at least one wire is partially disposed in and partially wrapped by the internal deformable component;

wherein the at least one wire, the internal deformable component, and the outer deformable component are disposed from inside to outside and are coaxially disposed.

3. The massager according to claim 1, wherein the housing comprises a main body portion, at least one transition portion and at least one mounting portion, and the main body portion, the at least one transition portion and the at least one mounting portion are connected in sequence;

wherein the main body portion and the at least one transition portion jointly define a first mounting space, the at least one mounting portion defines a second mounting space, the at least one transition portion defines a mounting hole, the mounting hole is disposed between the first mounting space and the second mounting space, and the mounting hole is communicated with the first mounting space and the second mounting space;

wherein the power supply component is disposed in the first mounting space, and the at least one wire passes through the second mounting space and the mounting hole and is electrically connected to the power supply component disposed in the first mounting space;

wherein the internal deformable component is partially disposed in the second mounting space and is limited by a limiting structure of the at least one transition portion, the limiting structure is disposed between the first mounting space and the second mounting space, the limiting structure is disposed around the mounting hole, and the limiting structure is configured to limit a portion of the internal deformable component in the second mounting space.

4. The massager according to claim 1, wherein the outer deformable component is made of flexible silicone, and/or the internal deformable component is made of a metal hose.

5. The massager according to claim 1, wherein the outer deformable component comprises a first connecting portion, a second connecting portion, and a deformable portion;

wherein the first connecting portion, the deformable portion, and the second connecting portion are connected in sequence, the first connecting portion is connected to the housing, the second connecting portion wraps the at least one vibrating assembly, and an outer diameter of the deformable portion is less than an outer diameter of the first connecting portion and an outer diameter of the second connecting portion.

6. The massager according to claim 5, wherein the outer diameter of the first connecting portion varies; and/or the outer diameter of the second connecting portion varies.

7. The massager according to claim 5, wherein the outer diameter of the first connecting portion varies continuously, and the outer diameter of the first connecting portion gradually decreases from a first end thereof away from the deformable portion toward a second end thereof connected to the deformable portion.

8. The massager according to claim 5, wherein the outer diameter of the second connecting portion varies continuously, and the outer diameter of the second connecting portion first gradually increases and then gradually decreases from a first end thereof away from the deformable portion toward a second end thereof connected to the deformable portion.

9. The massager according to claim 1, wherein the sealing sleeve is physically connected to the at least one deformable body.

10. The massager according to claim 1, wherein the massager defines a length direction in an initial state, a length of the at least one deformable body in the initial state along the length direction is L1, a length of the master controller along the length direction is L2, a length of the at least one vibrating assembly along the length direction is L3, $L3 \leq L2$, and $L1 \geq L2+L3$; and/or an outer diameter of a portion of the at least one deformable body disposed between the master controller and the at least one vibrating assembly is less than an outer diameter of a portion of the at least one deformable body sleeved on the at least one vibrating assembly and an outer diameter of the master controller.

11. The massager according to claim 1, wherein the at least one vibrating assembly comprises a vibrating component and a sleeve;

wherein the sleeve comprises a first sleeving portion, a second sleeving portion, and a stopping structure;

wherein the first sleeving portion defines a first sleeving space, the second sleeving portion defines a second sleeving space, the stopping structure is disposed on an inner side surface of a connecting junction of the first sleeving portion and the second sleeving portion, and the stopping structure defines a through hole;

wherein a first portion of the vibrating component is disposed in the first sleeving space, and a second portion of the vibrating component extends from one end of the first sleeving portion away from the second sleeving portion to an outside of the first sleeving portion, and the first portion of the vibrating component disposed in the first sleeving space is stopped by the stopping structure;

wherein a portion of the internal deformable component is disposed in the second sleeving space and is stopped by the stopping structure;

wherein the at least one wire passes through the second sleeving space and the through hole of the sleeve and is electrically connected to the vibrating component disposed in the first sleeving space.

12. The massager according to claim 11, wherein an inner diameter of the first sleeving portion is greater than an inner diameter of the second sleeving portion, and the inner diameter of the second sleeving portion is greater than an inner diameter of the stopping structure.

13. The massager according to claim 1, wherein the outer deformable component is injection molded around the at least one vibrating assembly, so that the outer deformable component is connected to a periphery of the at least one vibrating assembly.

14. The massager according to claim 1, wherein the master controller further comprises a control component and at least two charging terminals;

wherein the control component is disposed in the housing, the control component is electrically connected to the at least one vibrating assembly and the power supply component, and the control component is configured to control a state of the at least one vibrating assembly;

wherein a first end of each of the charging terminals is electrically connected to the power supply component, the at least two charging terminals are configured to charge the power supply component, and a second end of each of the charging terminals is exposed.

15. The massager according to claim 1, wherein the outer deformable component and the internal deformable component are physically connected to the housing.

* * * * *